(12) United States Patent
Cordier et al.

(10) Patent No.: US 12,677,122 B2
(45) Date of Patent: Jul. 7, 2026

(54) NFC DEVICE POSITION FINDER

(71) Applicants: STMicroelectronics Ltd, Kowloon (HK); STMicroelectronics (Rousset) SAS, Rousset (FR)

(72) Inventors: Nicolas Cordier, Aix-en-Provence (FR); Chia-Hao Chen, Taipei (TW)

(73) Assignees: STMicroelectronics Ltd, Kowloon (HK); STMicroelectronics (Rousset) SAS, Rousset (FR)

( * ) Notice: Subject to any disclaimer, the term of this patent is extended or adjusted under 35 U.S.C. 154(b) by 292 days.

(21) Appl. No.: 17/575,523

(22) Filed: Jan. 13, 2022

(65) Prior Publication Data

US 2022/0239335 A1 Jul. 28, 2022

(30) Foreign Application Priority Data

Jan. 22, 2021 (FR) ...................................... 2100604

(51) Int. Cl.
| | |
|---|---|
| *H04W 4/80* | (2018.01) |
| *H04B 5/20* | (2024.01) |
| *H04B 17/318* | (2015.01) |
| *H04L 67/75* | (2022.01) |
| *H04W 24/08* | (2009.01) |
| *G08B 3/00* | (2006.01) |
| *G08B 5/00* | (2006.01) |

(52) U.S. Cl.
CPC ................ *H04W 4/80* (2018.02); *H04B 5/20* (2024.01); *H04B 17/318* (2015.01); *H04L 67/75* (2022.05); *H04W 24/08* (2013.01); *G08B 3/00* (2013.01); *G08B 5/00* (2013.01)

(58) Field of Classification Search
None
See application file for complete search history.

(56) References Cited

U.S. PATENT DOCUMENTS

| | | | |
|---|---|---|---|
| 8,228,899 B2 | 7/2012 | Kim | |
| 8,928,602 B1 * | 1/2015 | Wan | ....................... G01R 33/06 |
| | | | 345/173 |

(Continued)

FOREIGN PATENT DOCUMENTS

| | | | | |
|---|---|---|---|---|
| CN | 109450568 A | * | 3/2019 | ........... H04B 17/318 |
| EP | 2747193 A1 | | 6/2014 | |

(Continued)

OTHER PUBLICATIONS

Belkin, "Indicator light behavior of the Belkin BOOST UP Qi Wireless Charging Pad, F8M741 and F8M747," URL=https://www.belkin.com/au/support-article?articleNum=123739, download date Jul. 20, 2021, 3 pages.

(Continued)

*Primary Examiner* — Gennadiy Tsvey
(74) *Attorney, Agent, or Firm* — Seed Intellectual Property Law Group LLP

(57) ABSTRACT

A method is provided that is implemented by a first NFC device configured in reader mode. The method includes evaluating an information about the coupling between the first NFC device and a second NFC device configured in card mode, as a function of the position of an antenna of the first NFC device with respect to an antenna of the second NFC device. The method further includes indicating the information by a user interface of the first device.

15 Claims, 4 Drawing Sheets

(56) References Cited

U.S. PATENT DOCUMENTS

| | | | | |
|---|---|---|---|---|
| 9,083,813 B2 * | 7/2015 | Sekita | | H04L 69/40 |
| 9,178,571 B2 * | 11/2015 | Tanaka | | H04B 5/73 |
| 9,367,785 B2 | 6/2016 | Sabesan et al. | | |
| 9,496,744 B2 * | 11/2016 | Porat | | H02J 50/90 |
| 10,498,401 B1 * | 12/2019 | Rule | | H04N 23/60 |
| 10,862,540 B1 | 12/2020 | Osborn et al. | | |
| 11,055,691 B2 * | 7/2021 | Deprun | | G06Q 20/3278 |
| 11,588,519 B2 | 2/2023 | Chen et al. | | |
| 2006/0239675 A1 * | 10/2006 | Lizuka | | H04N 23/635 |
| | | | | 348/E7.079 |
| 2007/0129863 A1 * | 6/2007 | Hsu | | G08G 1/168 |
| | | | | 701/1 |
| 2008/0093447 A1 * | 4/2008 | Johnson | | G06V 30/142 |
| | | | | 235/383 |
| 2008/0296978 A1 | 12/2008 | Finkenzeller et al. | | |
| 2009/0046654 A1 | 2/2009 | Hoshi et al. | | |
| 2009/0052618 A1 * | 2/2009 | Homanfar | | G03B 42/047 |
| | | | | 340/967 |
| 2009/0321510 A1 * | 12/2009 | Day | | G06K 7/10386 |
| | | | | 235/375 |
| 2012/0208458 A1 | 8/2012 | Iwasaki et al. | | |
| 2013/0084801 A1 | 4/2013 | Royston et al. | | |
| 2013/0096651 A1 | 4/2013 | Ozawa et al. | | |
| 2013/0214735 A1 | 8/2013 | Kang et al. | | |
| 2014/0011452 A1 | 1/2014 | Ji et al. | | |
| 2014/0065959 A1 | 3/2014 | Tanaka et al. | | |
| 2014/0168012 A1 | 6/2014 | Mankowski et al. | | |
| 2014/0361735 A1 | 12/2014 | Li et al. | | |
| 2015/0100109 A1 | 4/2015 | Feldman et al. | | |
| 2015/0223084 A1 | 8/2015 | Lightstone et al. | | |
| 2015/0363617 A1 * | 12/2015 | Honore | | G06K 7/10366 |
| | | | | 340/10.6 |
| 2016/0080895 A1 * | 3/2016 | Peters | | G06K 7/0008 |
| | | | | 455/41.1 |
| 2016/0183909 A1 * | 6/2016 | Mehendale | | A61B 6/4405 |
| | | | | 378/205 |
| 2017/0033587 A1 | 2/2017 | Hong et al. | | |
| 2017/0111943 A1 * | 4/2017 | Kersjes | | H04B 5/20 |
| 2017/0184751 A1 * | 6/2017 | Ang | | G01V 1/44 |
| 2017/0321540 A1 * | 11/2017 | Lu | | E21B 47/107 |
| 2018/0053995 A1 | 2/2018 | Randell et al. | | |
| 2018/0098676 A1 * | 4/2018 | Ryu | | A47L 9/2805 |
| 2018/0167502 A1 * | 6/2018 | Madhani | | H04W 4/021 |
| 2018/0321687 A1 * | 11/2018 | Chambers | | G06F 16/29 |
| 2019/0044549 A1 * | 2/2019 | Pillai | | H04W 4/70 |
| 2019/0219678 A1 | 7/2019 | Miyazawa | | |
| 2019/0305567 A1 | 10/2019 | Keeley et al. | | |
| 2020/0124396 A1 * | 4/2020 | Honkura | | G01B 7/003 |
| 2020/0287426 A1 * | 9/2020 | Granito | | H04B 5/0037 |
| 2020/0303958 A1 | 9/2020 | Tanii et al. | | |
| 2020/0382630 A1 | 12/2020 | Jin et al. | | |
| 2021/0096515 A1 | 4/2021 | Ruaro et al. | | |
| 2021/0099027 A1 * | 4/2021 | Larsson | | H02J 50/90 |
| 2021/0108818 A1 * | 4/2021 | Amundson | | G08B 21/14 |
| 2021/0120521 A1 * | 4/2021 | Bin Redhwan | | H04W 64/006 |
| 2022/0042854 A1 * | 2/2022 | Nagasawa | | G01K 3/005 |
| 2022/0057453 A1 | 2/2022 | Nicklaus et al. | | |
| 2022/0094393 A1 | 3/2022 | Chen et al. | | |
| 2022/0103023 A1 | 3/2022 | Govindaraj et al. | | |
| 2023/0239006 A1 | 7/2023 | Fleischhacker et al. | | |

FOREIGN PATENT DOCUMENTS

| | | | | | |
|---|---|---|---|---|---|
| JP | 2015106814 A | * | 6/2015 | | |
| KR | 20110067708 A | * | 6/2011 | | |
| KR | 101827107 B1 | * | 2/2018 | | G01S 11/06 |
| WO | WO 2005/069195 A1 | | 7/2005 | | |
| WO | WO 2014/037888 A1 | | 3/2014 | | |
| WO | WO 2014/202403 A1 | | 12/2014 | | |

OTHER PUBLICATIONS

Mearian, L., "Review: 4 wireless chargers for both smartphone and watch (one of which does earbuds, too)," URL=https://www.computerworld.com/article/3326823/review-4-wireless-chargers-for-both-smartphone-and-watch.html, download date Jul. 20, 2021, 11 pages.

ION Audio, "ION Audio Pathfinder Charger—Frequently Asked Questions," URL=https://www.ionaudio.com/KB/ION-AUDIO-PATHFINDER-CHARGER-FREQUENTLY-ASKED-QUES-TIONS/, download date Jul. 20, 2021, 6 pages.

Samsung, SM-R800, SM-R805F, SM-R810, SM-R815F User Manual Rev. 1.2, www.samsung.com, 154 pages.

* cited by examiner

NFC DEVICE POSITION FINDER

BACKGROUND

Technical Field

The present disclosure generally relates to electronic circuits, and more specifically to electromagnetic transponders or electronic tags. The present description in particular applies to electronic devices incorporating a near-field communication (NFC) circuit, more commonly called NFC devices, and the detection of the presence of such a device in the field of another device.

Description of the Related Art

Electromagnetic transponder communication systems are increasingly common, in particular, since the development of near-field communication technologies. These systems typically use a radiofrequency electromagnetic field generated by an NFC device (terminal or reader) to be coupled (for example be detected, and then communicate) with another NFC device (card) located within range. More precisely, the radiofrequency electromagnetic fields are generated and/or detected by the antennas of the NFC devices. The antenna position in NFC devices is not standardized, so the NFC antenna position may vary in devices of the same type of product (for example in mobile phone or smartphone). As the coupling factor between the devices depends on the respective positions of the antennas, it is desirable to obtain information about these respective positions.

The radiofrequency electromagnetic field generated by an NFC device allows the detection, and then the communication, with another NFC device if their respective antennas are close enough to each other. Detection distances are usually less than 10 cm, and in some cases less than 4 cm, which increase the importance of being able to identify the respective positions between two paired devices.

BRIEF SUMMARY

There is a need to improve NFC device coupling.

In particular, there is a need to improve the speed of reaching an acceptable or optimum coupling between two NFC devices.

One or more embodiments of the present disclosure addresses all or some of the drawbacks of the known methods and circuits for detecting the presence of an NFC device by another NFC device emitting an electromagnetic field.

One embodiment provides a method, implemented by a first NFC device configured in reader mode, comprising:

a step of evaluating an information about the coupling between the first NFC device and a second NFC device configured in card mode, as a function of the position of an antenna of the first NFC device with respect to an antenna of the second NFC device; and a step of indicating said information by means of a user interface of the first device.

One embodiment provides a system comprising a first NFC device configured in reader mode and a second NFC device configured in card mode, the first NFC device being adapted to implement the method as described.

According to an embodiment, said indication of the information representative of the coupling is a visual indication.

According to an embodiment, said indication of the information representative of the coupling is an audible indication.

According to an embodiment, said evaluation step comprises a measurement step, by the first NFC device, of RSSI values from the second NFC device, according to the relative position of the first NFC device antenna with respect to the second NFC device antenna.

According to an embodiment, the method or the system further comprising a comparison step of the measured RSSI values with a target value.

According to an embodiment, the target value is stored in an internal memory of the first NFC device.

According to an embodiment, the target value is stored in a remote server.

According to an embodiment, the indication step comprises a mapping of said information representative of the coupling, based on a distribution of the RSSI values in, at least, three ranges of values.

According to an embodiment, a color is affected to each range of value.

According to an embodiment, a sound is affected to each range of value.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the radiofrequency signals and their interpretation have not been described in detail, the described embodiments and modes of implementation being compatible with the standard techniques for generating and interpreting these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figures 1, 2:
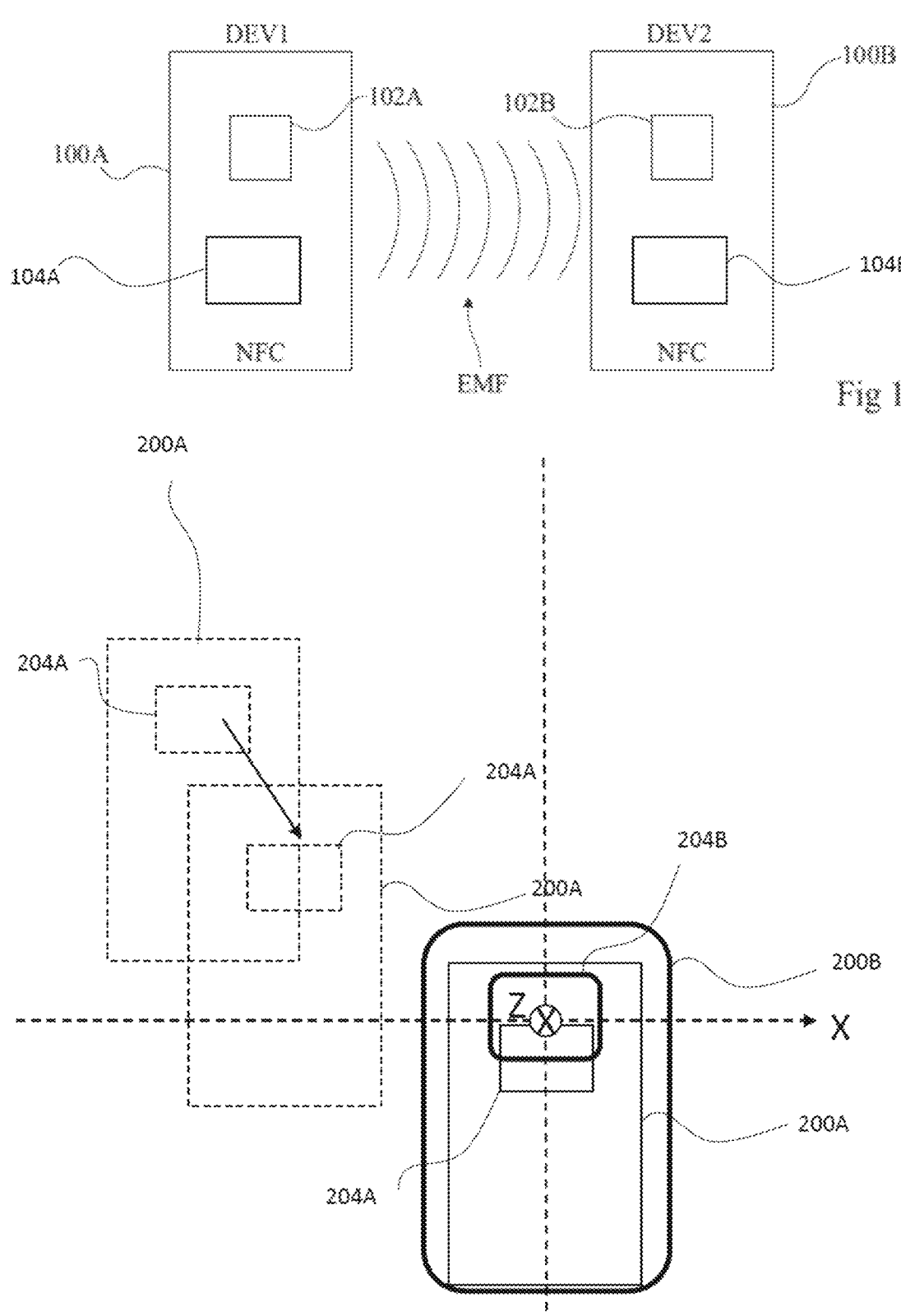
FIG. 1 shows, very schematically and in block diagram form, an exemplary near field communication system, of the type to which, as an example, the described embodiments and modes of implementation apply.
FIG. 2 shows, schematically and in block diagram form, an embodiment of a near field communication system.

FIG. 1 shows, very schematically and in block diagram form, an exemplary near field communication system, of the type to which, as an example, the described embodiments and modes of implementation apply.

The case is arbitrarily considered of two electronic devices, for example a mobile phone and another electronic device, but what is described applies more generally to any system in which a reader, terminal or device radiates an electromagnetic field able to be detected by a device operating as transponder. To simplify, reference will be made to NFC devices in order to designate electronic devices incorporating one or several near-field communication (NFC) circuits.

In the illustrated example, a first NFC device 100A (DEV1) is able to communicate, by near-field electromagnetic coupling, with a second NFC device 100B (DEV2). Depending on the applications, for a communication, one of the NFC devices 100A, 100B operates in so-called reader mode, while the other NFC device 100B, 100A operates in so-called card mode, or both NFC devices 100A, 100B communicate in peer-to-peer (P2P) mode. The device operated in a card mode can comprise a passive tag.

Each NFC device 100A, 100B incorporates a near-field communication circuit symbolized, in FIG. 1, by a block 102A, 102B. The near-field communication circuits 102A and 102B each have various elements or electronic circuits for generating or detecting a radiofrequency signal using respective antennas 104A, 104B, for example modulation or demodulation circuits. During a communication between the NFC devices 100A and 100B, the radiofrequency signal generated by one of the NFC devices 100A, 100B is detected by the other NFC device 100B, 100A located within range.

It is arbitrarily considered, as illustrated in FIG. 1, that the first NFC device 100A emits an electromagnetic field (EMF) in order to initiate a communication with the second NFC device 100B. The field EMF is detected by the second NFC device 100B once it is within range. A coupling is then formed between the respective oscillating circuits of the first NFC device 100A and the second NFC device 100B. This coupling is reflected by a variation of the charge made up of the circuits of the NFC device 100B on the oscillating circuit for generating the field EMF of the NFC device 100A.

In practice, for a communication, a corresponding phase or amplitude variation of the transmitted field is detected by the device 100A, which then begins an NFC communication protocol with the device 100B. On the NFC device 100A side, in practice it is detected whether the amplitude of the voltage across the terminals of the oscillating circuit and/or the phase shift relative to the signal generated by the circuit 102A differ from the amplitude and/or phase ranges (or windows) each delimited by first and second thresholds. For example, the first threshold is below the second threshold. Reference will be made hereinafter to lower and upper thresholds.

The range of a radiofrequency signal is, usually, lower than 10 cm and can be, for example, lower than 4 cm. As the coupling factor between the devices depends on the respective positions of the antennas, theses low values make the NFC optimal coupling determination between two NFC devices, sometimes difficult in order to generate a communication. If an optimal coupling between both devices isn't found, the communication will then be impacted, such as its speed which will be reduced or errors will break the communication.

In order to respect speed constraints of the near-field communication and due to the fact that at least one of the devices moves during the communication, it is important that the coupling factor between two NFC devices remains sufficient and thus that the respective positions of two paired devices is acceptable. When the coupling factor between two devices is too low, the communication can be lost.

A solution could be to print on the surface of each device an identifier of the location of the antenna. However, such solution is not always acceptable by the manufacturers in view of the shape, the aesthetic, the size, etc., of the device.

The present disclosure provides, in order to solve this problem, mapping of the coupling factor between a device in card mode and a device in reader mode, according to the relative position of the devices. For example, the present disclosure provides mapping of the coupling factor when the surface of the device in card mode is scanned with the device in reader mode. The mapping of the coupling factor according to the relative position of the devices is, for example, a visual or an audible mapping.

Information representative of the coupling factor is, for example, displayed, through a color code, on a screen of the reader mode device. For example, a red area in the screen corresponds to a high coupling factor while a green area in the screen corresponds to a low coupling factor.

When a user wants to couple his mobile phone with an NFC device, he can then easily find the correct position of his mobile phone with respect to the NFC device in order to have an optimal coupling factor. He is thus able to maintain this position during all the communication steps.

FIG. 2 shows, schematically and in block diagram form, an embodiment of a near field communication system.

The system includes an NFC device 200A and an NFC device 200B. According to the present description, the NFC devices 200A operates in reader mode, while the other NFC device 200B operates in card mode. The NFC device 200A is, for example, a mobile phone or a smartphone. The device 200B is, for example, another mobile phone, a wireless speaker, a pair of earbuds, a television, a laptop, a car, a coffee machine, any electronic device or any other NFC device.

The system of FIG. 2 provides the determination of the relative position of the device 200A with respect to the device 200B in which the coupling factor is the highest. In FIG. 2, the device 200A is represented three times of which two times are in dotted lines and one time is in solid lines aligned with the device 200B.

The dotted line representations of the device 200A correspond to two possible intermediate positions of the device 200A in the orthogonal system during the process of determining the relative position of the device 200A with respect to the device 200B. The solid line representation of the device 200A corresponds to the position of the device 200A at the end of the process.

Each NFC device 200A, 200B incorporates a near-field communication circuit an antenna symbolized, in FIG. 2, by a block 204A, 204B. One of the antennas can be passive.

In FIG. 2, the device 200A is scanning the surface of the device 200B in a three-dimensional orthogonal system. The three-dimensional orthogonal system comprises an axis X that corresponds to the horizontal axis going through the center of the antenna 204B, an axis Y that corresponds to the vertical axis going through the center of the antenna 204B, and an axis Z orthogonal to the axis X and Y.

During this scanning step, the device 200A detects, through its antenna 204A, and evaluates, during an evaluation step, the strength of the load modulation (active or passive) sent by the device 200B according to the position of the device 200A. The received signal strength indication value or RSSI value provides information about the coupling factor. The RSSI value is maximal at the optimal coupling.

In practice, optimal coupling is not always obtained when both antennas 204A and 204B are geometrically aligned. Indeed, the integrated circuit and more generally the conductor parts (enclosures, shields, printed circuit boards) of the devices 200A and 200B located around the antennas 204A and 204B can modify the coupling factor.

Figure 3:
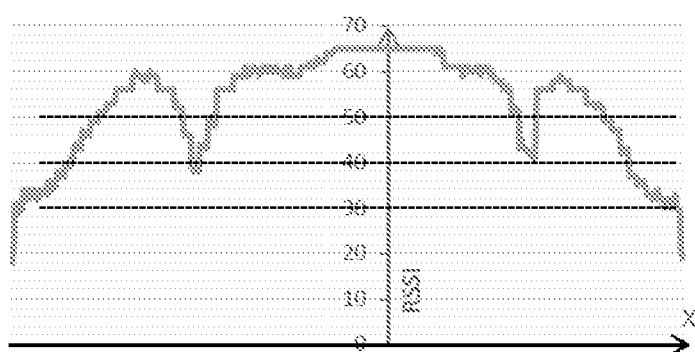
FIG. 3 is a graph showing the evolution of the RSSI value according to the position of an NFC device, of the system illustrated in FIG. 2, along an axis X.
Figure 4:
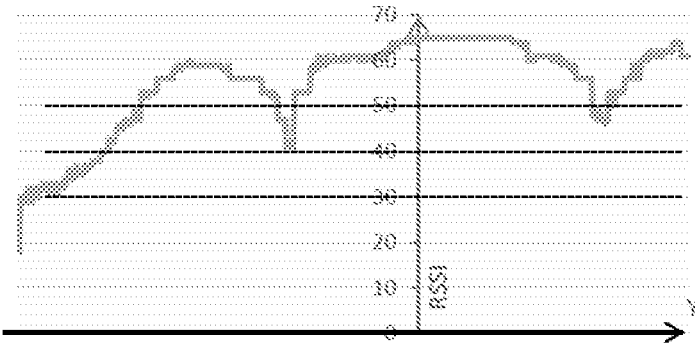
FIG. 4 is a graph showing the evolution of the RSSI value according to the position of an NFC device, of the system illustrated in FIG. 2, along an axis Y.

The evolution of the coupling factor with respect to the axis X and the axis Y is described in relation with FIGS. 3 and 4.

FIG. 3 is a graph showing the evolution of the RSSI value according to the position of the device 200B along the axis X.

FIG. 4 is a graph showing the evolution of the RSSI value according to the position of the device 200B along the axis Y.

The graphs illustrated in FIGS. 3 and 4 were obtained by scanning, as described in FIG. 2, the surface of the device 200B with the device 200A respectively along axes X and Y.

These graphs are based on devices containing planar antennas but those skilled in the art can easily adapt the description of FIGS. 3 and 4 to other antenna shapes. Moreover, these graphs are based on the shapes of the devices 200A and 200B shown in FIG. 2. Indeed, these graphs are based on devices wherein the antenna of each device is not aligned with the geometric center of the device. More precisely, in this example, the antenna of each device is horizontally, but not vertically aligned with the center of the device. Such a misalignment leads to the fact that the antenna efficiency is impaired due to conductive part located around the antennas.

The evolution of the RSSI value, according to the position of the device 200A along the axis X (FIG. 3), is approximately symmetric with respect to a position corresponding to the geometric alignment of both antennas 204A and 204B. Furthermore, the highest value of RSSI and therefore the optimal coupling factor are obtained along the axis X at the position when both antennas 204A and 204B are geometrically aligned.

The evolution of the RSSI value, according to the position of the device 200A along the axis Y, is not symmetric due to the conductive part located around the antennas with impair their efficiencies. Furthermore, the highest value of RSSI and therefore the optimal coupling factor are obtained along the axis Y when the center of the antenna 204A is lowly shifted down of the center of the antenna 204B.

The following graphs were, for example, obtained for an antenna 204B having a length along the X axis of 40 mm and a width along the Y axis of 22 mm.

Figure 5:
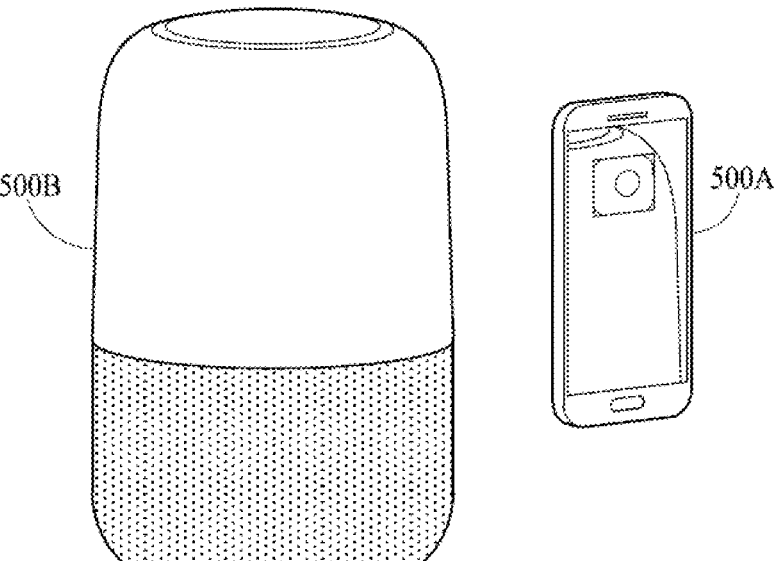
FIG. 5 shows, schematically, an example of the embodiment of a near field communication system described in FIG. 2.

FIG. 5 shows, schematically, an example of the embodiment of a near field communication system described in FIG. 2.

The example of FIG. 5 is based on the optimal coupling search between a reader mode smartphone 500A and a card mode wireless speaker 500B.

In FIG. 5, the user is scanning the surface of the device 500B with the smartphone 500A in order to localize the position of the smartphone 500A leading to the optimal coupling factor in order to generate a communication. The movement of the scan can be evaluated thanks to existing sensors embedded into the smartphone 500A such as an accelerometer and/or a LiDAR sensor and/or a camera in order to determine the position of the measurement relative to the device 500B.

During the scanning step, the smartphone 500A measures the RSSI. The smartphone 500A generates, thanks to a dedicated application/program, a mapping of the RSSI values. This mapping is then provided to the user via a user interface, for example, a visual or audible interface.

According to the embodiment shown in FIG. 5, the mapping is a visual mapping.

For example, the mapping, displayed on a screen of the smartphone, corresponds to a colored map in which each color is associated with a range of RSSI values. For example, in the colored map:

positions of the smartphone 500A where the RSSI value is higher than 50 dB are represented in red;

positions of the smartphone 500A where the RSSI value is comprised between 40 dB and 50 dB are represented in yellow;

positions of the smartphone 500A where the RSSI value is comprised between 30 dB and 40 dB are represented in green; and positions of the smartphone 500A where the RSSI value is less than 30 dB are represented in blue.

According to another example, the mapping corresponds to a grey scale representation in which each grey level is associated with a range of RSSI values.

According to another embodiment, the mapping is an audible mapping. For example, a sound is emitted with a frequency depending on the RSSI value, preferably with a high frequency when the RSSI value is high and with a low frequency when the RSSI value is low. According to another example, a sound with the same tone is repeated at a different frequency depending on the RSSI value. The audible mapping can also be based on the volume of a sound.

According to another embodiment, the mapping is based on the vibration frequency of the smartphone 500A. For example, the vibration frequency of the smartphone is high when the smartphone 500A detects a high RSSI value and the vibration frequency of the smartphone is low when the smartphone 500A detects a low RSSI value.

The example shown in FIG. 5 is based on a coupling between a smartphone and a wireless speaker. However, it also applies to a coupling between a smartphone and another mobile phone, a pair of earbuds, a television, a laptop, a car, a coffee machine, any electronic device or any other NFC device.

Figure 6:
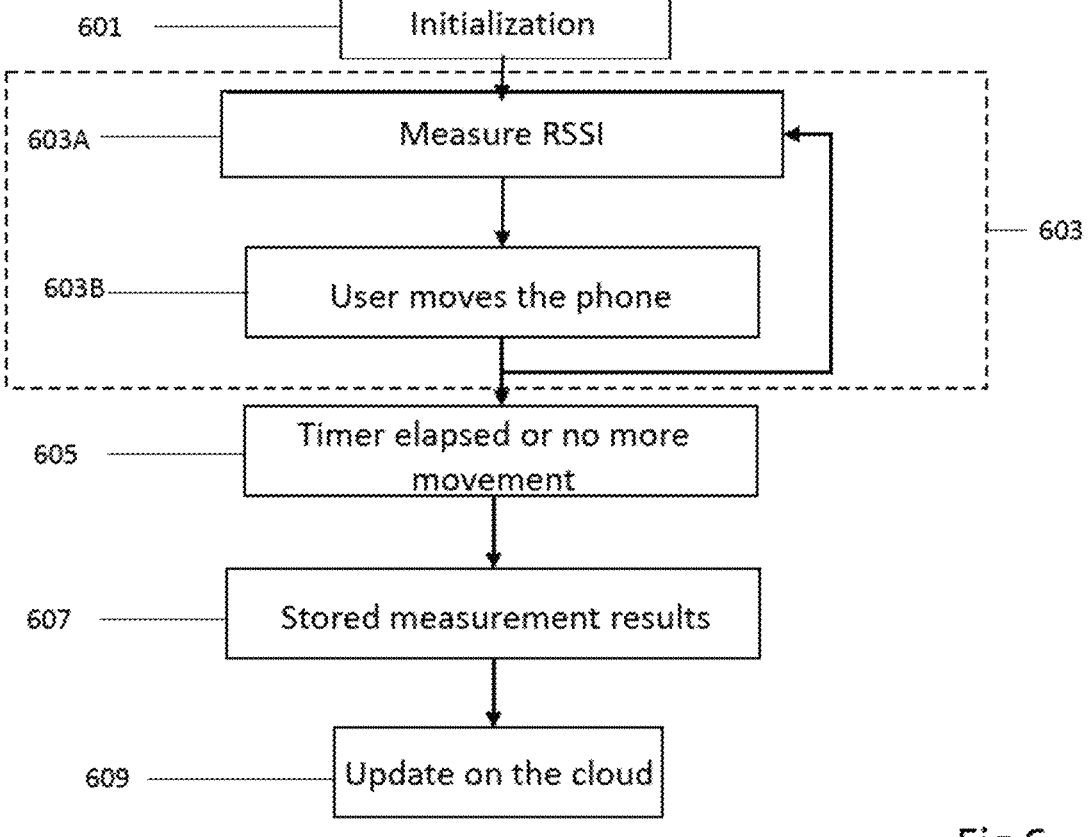
FIG. 6 shows, in the form of block diagrams, a method for implementing the system illustrated in FIG. 2.

FIG. 6 shows, in the form of block diagrams, a method for implementing the system illustrated in FIG. 2.

The method illustrated in FIG. 6 allows the determination of the optimal coupling factor between the device 200A (FIG. 2) and the device 200B (FIG. 2). The method illustrated in FIG. 6 also allows the record of the RSSI measurements.

A first step 601 (Initialization) consists in the initialization of the searching of the optimal coupling between both devices 200A and 200B (FIG. 2). During step 601, the user can, for example, start the device 200A or start the dedicated application on device 200A. During step 601, the user can also bring the device 200A close to the device 200B in order to detect the device 200B.

The step 601 is followed by the scanning step 603 corresponding to the scanning step disclosed in relation with FIGS. 2 to 5.

The step 603 consists in making, in a loop, successive RSSI measurements as long as a movement of the device 200A is detected or until the end of a preset time. During the scanning step 603, the device 200A creates, via its user interface, a mapping of the RSSI measurements according to its position.

The step 603, comprises two sub-steps consisting in the RSSI measurement (block 603A, Measure RSSI) and a movement of the device 200A (block 603B, User moves the phone). The RSSI measurement is periodic depending on parameters of device 200A. Each measurement corresponds to a position of the device.

When the RSSI is measured, information about its value is returned to the user via the user interface. If the user sees that the position indicated by the measure interface does not correspond to an optimal position, he can continue move the device 200A with respect to the device 200B in order to reach a better position. Another measure of the RSSI is then made at the new position.

These sub-steps are repeated until no more movement is detected or until the preset time ends (block 605, Timer elapsed or no more movement).

For example, the expression "no more movement" refers to a speed limit below which the system considers that the user is no longer moving the device 200A.

The preset time is, for example, determined by the user through the user interface of the device 200A. As an alternative, the preset time is determined by the manufacturer(s) of the devices 200A and 200B. The preset time depends, for example, on the type and/or size of the device 200B.

The step 605 is followed by a step 607 (Stored measurement results) in which the measurement results or RSSI measurements are recorded or stored.

The RSSI measurements are, for example, stored in the internal memory of the device 200A and/or in a remote server, for example, an Internet server, such as the cloud (block 609, Update on the cloud).

The recorded measurements are, for example, classified, in at least one of the memories cited above, by type and model of the device 200B. In other words, the RSSI measurements of the coupling between a smartphone and a model A of wireless speaker are associated together, while the RSSI measurements of the coupling between a smartphone and a model B of wireless speaker are separately associated together.

This allows to retrieve the optimal coupling based on previous measurements with the same association of devices.

Figure 7:
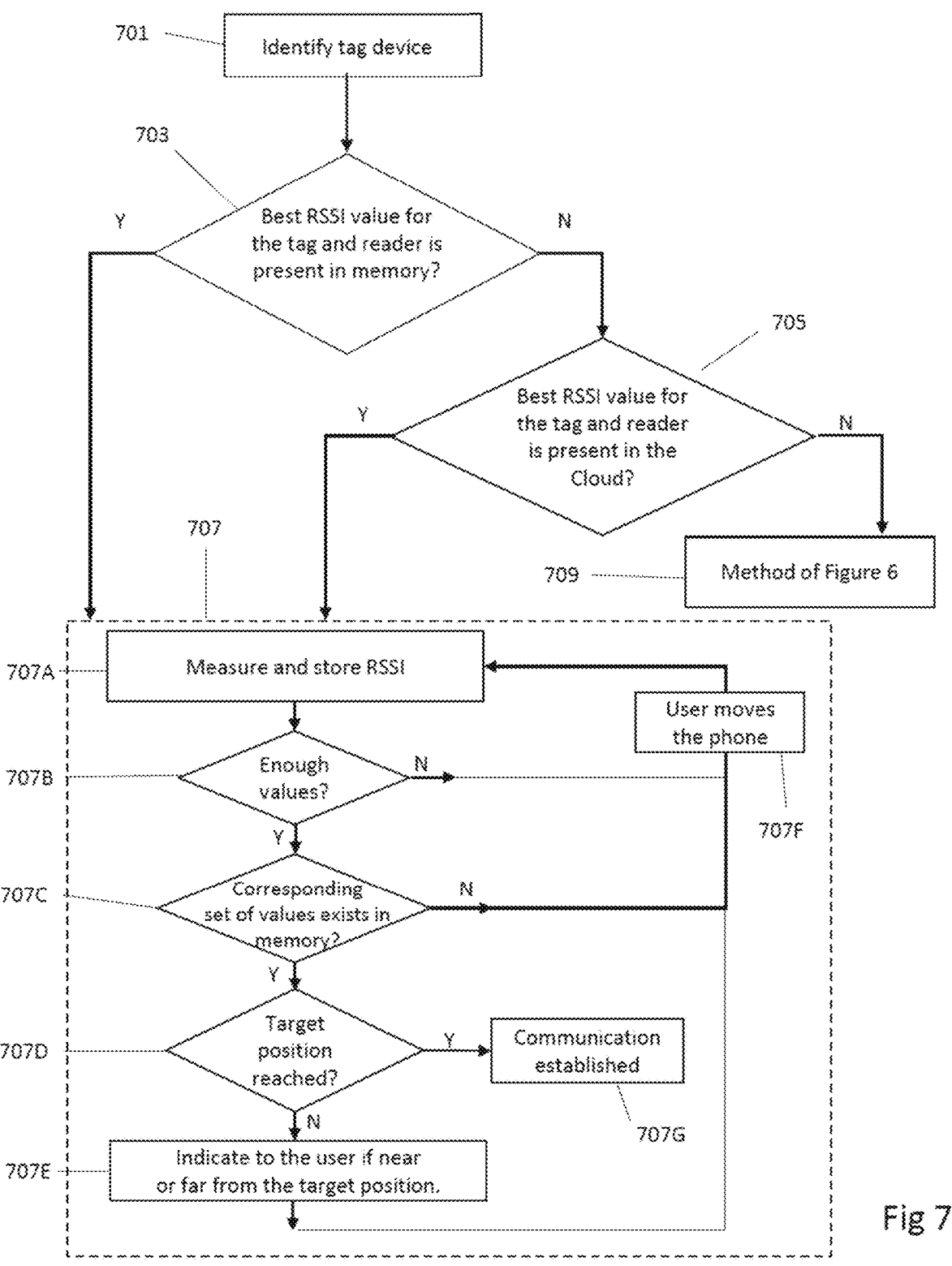
FIG. 7 shows, in the form of block diagrams, another method for implementing the system illustrated in FIG. 2.

FIG. 7 shows, in the form of block diagrams, another method for implementing the system illustrated in FIG. 2.

The method illustrated in FIG. 7 allows the guidance, of the user, to a target position for which the RSSI measurement is similar or close to an optimal RSSI value or target value.

The target value of the method illustrated in FIG. 7 corresponds, when it exists, to the highest RSSI value, stored in memory during the method disclosed in relation with FIG. 6. As an alternative, the target value corresponds to the average of the respective highest RSSI values of all sets of measurements stored. The target value is specific to each type and model of device.

A first step 701 (Identify tag device) consists in the identification of the device 200B by the device 200A. This first step 701 allows the type and the model of the device 200B to be known. The identification of the device 200B is, for example, based on an initial communication in which device 200B sends an identifier to device 200A. As an alternative, the first step 701 consists in reading a bar code of the device 200B using a camera that equips the device 200A.

The step 701 is followed by a step 703 (Best RSSI value for the tag and reader is present in memory?) that corresponds to the search of RSSI values related to the device 200B in the internal memory of the device 200A.

If stored RSSI values are not found in the internal memory (output N of block 703), the step 703 is followed by a step 705 (Best RSSI value for the tag and reader is present in the Cloud?) that corresponds to the search of RSSI values related to the device 200B in a remote server, for example in the Cloud.

If RSSI values are not found in the Cloud (output N of block 705), step 705 is followed by a step 709 (Communication established) during which the method illustrated in FIG. 6 is implemented.

If RSSI values are either found in the internal memory during the step 703 (output Y of block 703), or found in the cloud during step 705 (output Y of block 705), a step 707 is performed.

The step 707 consists in making, in a loop, successive RSSI measurements as long as the target position is not reached.

The step 707 starts with a sub-step 707A of RSSI measurement (Measure and store RSSI).

Similarly to what has been described in FIG. 6, the RSSI measurement is periodic depending on parameters of device 200A. Each measurement corresponds to a position of the device.

According to an embodiment, when the RSSI is measured, its value is added to a set of RSSI measurements, made of between, for example, 5 to 20 values.

The sub-step 707A is followed by a sub-step 707B in which it is determined whether the number of RSSI measurements is sufficient in order to determine the position of the device 200A (Enough values?). If the set of RSSI measurements doesn't have enough values (output N of block 707B), no feedback is provided to the user who can continue to move the device 200A during a sub-step 707F (User moves the phone). Sub-steps 707F, 707A and 707B are repeated until the number for values is reached.

When the set of RSSI measurements has enough values (output Y of block 707B), the sub-step 707B is followed by a sub-step 707C determining whether the set of RSSI measurements has a corresponding set of values in the memory (Corresponding set of values exists in memory?). If no correspondence is found (output N of block 707C), no feedback is provided to the user who can continue to move the device 200A during the sub-step 707F, the sub-steps 707F, 707A, 707B and 707C are then repeated until an equivalence is found.

A correspondence between a set of RSSI measurements and a set of values in the memory allows the determination of the position of the device 200A with respect to the target position.

The sub-step 707C is, when a correspondence is found (output Y of block 707C), followed by a sub-step 707D in which it is determined whether the target position is reached (Target position reached?). During the sub-step 707D, the RSSI measurement is, for example, compared to the target value. An information about the RSSI measurement is, for example, returned to the user. This information about the RSSI measurement can correspond to a color indication.

For example:

if the RSSI measurement is greater than 75% of the target value, a red light is displayed on the user interface;

if the RSSI measurement is comprised between 75% and 50% of the target value, a yellow light is displayed on the user interface; and if the RSSI measurement is lower than 50% of the target value, a green light is displayed on the user interface.

If the target value is reached (output Y of block 707D), the communication between both devices 200A and 200B is established in a step 707G (Communication established) and the loop ends.

If the target value is not reached (output N of block 707D), the sub-step 707D is followed by a sub-step 707E indicating to the user the position of the device 200A with respect to the target position (Indicate to the user if near or far from the target position).

During the sub-step 707E, information about the distance between the device 200A and the target position is provided to the user through the user interface. For example, this information is an audible information or a visual information.

According to an embodiment, this information corresponds to a sound, with the same tone, which is repeated at a different frequency depending on the distance between the position of the device 200A with respect to the target position. For example, if the device 200A is located close to the target position, the sound is repeated with a high frequency while the sound is repeated with a low frequency if the device 200A is far from the target position.

According to another embodiment, this information corresponds to a visual display, such as arrows, indicating the direction of the target position. Existing sensors of the device are preferably used to indicate the relative position of the phone with the target position to the user.

After the sub-step 707E, the user can move the phone during the sub-step 707F. The sub-steps 707A, 707B, 707C, 707D, 707E and 707F are then repeated until the target position is reached.

For example, the user interface of the device 200A allows the user to determine if he wants to execute the method disclosed in relation with FIG. 6 or the method disclosed in relation with FIG. 7.

An advantage of the disclosed embodiments is that the target position is quickly reached.

Another advantage of the disclosed embodiments is that it allows to have a high coupling factor between both devices.

Another advantage of the disclosed embodiments is that it allows to have a fast communication.

Various embodiments and variants have been described. Those skilled in the art will understand that certain features of these embodiments can be combined and other variants will readily occur to those skilled in the art. In particular, those skilled in the art are capable of adapting the embodiments and modes of implementation previously disclosed to other embodiments and modes of implementation in which audible and visual information are different from those indicated in the present disclosure.

Finally, the practical implementation of the embodiments and variants described herein is within the capabilities of those skilled in the art based on the functional description provided hereinabove.

A method, implemented by a first NFC device (200A; 500A) configured in reader mode, may be summarized as including a step of evaluating (603; 707) an information about the coupling between the first NFC device and a second NFC device (200B; 500B) configured in card mode, as a function of the position of an antenna (204A) of the first NFC device with respect to an antenna (204B) of the second NFC device; and a step of indicating (603; 707E) said information on a user interface of the first device.

A system may be summarized as including a first NFC device (200A; 500A) configured in reader mode and a second NFC device (200B; 500B) configured in card mode, the first NFC device being adapted to implement the method.

Said indication of the information representative of the coupling may be a visual indication.

Said indication of the information representative of the coupling may be an audible indication.

Said evaluation step (603; 707) may include a measurement step (603A; 707A), by the first NFC device (200A), of RSSI values from the second NFC device (200B), according to the relative position of the first NFC device antenna (204A) with respect to the second NFC device antenna (204B).

The method or system may further include a comparison step (707D) of the measured RSSI values with a target value.

The target value may be stored (607) in an internal memory of the first NFC device.

The target value may be stored (609) in a remote server.

The indication step (603) may include a mapping of said information representative of the coupling, based on a distribution of the RSSI values in, at least, three ranges of values.

A color may be affected to each range of value.

A sound may be affected to each range of value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, implemented by a first near-field communications (NFC) device, of a first device, configured in a reader mode, comprising:

evaluating an information representative of a coupling between the first NFC device and a second NFC device configured in card mode, as a function of a position of an antenna of the first NFC device with respect to an antenna of the second NFC device; and indicating the information by a user interface of the first device, wherein indicating the information includes:

mapping the information representative of the coupling based on a distribution of received signal strength indication (RSSI) values in at least three ranges of RSSI values;

displaying a 2-dimensional heatmap in which each color is associated with a respective range of RSSI values of the at least three ranges of RSSI values, wherein the heatmap comprises a first heatmap charting the distribution of the RSSI values in the at least three ranges of RSSI values corresponding to a movement of the first NFC device in relation to the second NFC device in a first direction, and a second heatmap charting the distribution of the RSSI values in the at least three ranges of RSSI values corresponding to a movement of the first NFC device in relation to the second NFC device in a second direction perpendicular to the first direction; and displaying the 2-dimensional heatmap superposed on an image of a second device including the second NFC device, wherein a position of a color associated with a highest range of RSSI values of the at least three ranges of RSSI values overlaps with a position of the second NFC device in the second device in the 2-dimensional heatmap.

2. The method according to claim 1, wherein the indication of the information representative of the coupling is a visual indication.

3. The method according to claim 1, wherein the indication of the information representative of the coupling is an audible indication.

4. The method according to claim 1, wherein the evaluating includes measuring by the first NFC device, the RSSI values from the second NFC device, according to a relative position of the first NFC device antenna with respect to the second NFC device antenna.

5. The method according to claim 4, further comprising comparing the RSSI values with a target value.

6. The method according to claim 5, wherein the target value is stored in an internal memory of the first NFC device.

7. The method according to claim 5, wherein the target value is stored in a remote server.

8. The method according to claim 1, wherein a sound is associated with each range of RSSI values.

9. The method according to claim 1, wherein the evaluating includes measuring a plurality of RSSI values provided by the second NFC device for different positions of the antenna of the first NFC device with respect to the antenna of the second NFC device, and for each RSSI measurement, measuring a movement of the first NFC device with respect to the second NFC device.

10. A system, comprising:

a first near-field communications (NFC) device, of a first device, configured in reader mode, the first NFC device having a user interface; and a second NFC device configured in card mode, the first device being configured to:

evaluate an information representative of a coupling between the first NFC device and the second NFC device, as a function of a position of an antenna of the first NFC device with respect to an antenna of the second NFC device;

indicate the information by the user interface of the first device, wherein indicating the information includes mapping the information representative of the coupling based on a distribution of received signal strength indication (RSSI) values in at least three ranges of RSSI values and displaying a 2-dimensional heatmap in which each color is associated with respective a range of RSSI values of the at least three ranges of RSSI values, wherein the heatmap comprises a first heatmap charting the distribution of the RSSI values in the at least three ranges of RSSI values corresponding to a movement of the first NFC device in relation to the second NFC device in a first direction, and a second heatmap charting the distribution of the RSSI values in the at least three ranges of RSSI values corresponding to a movement of the first NFC device in relation to the second NFC device in a second direction perpendicular to the first direction; and display the 2-dimensional heatmap superposed on an image of a second device including the second NFC device, wherein a position of a color associated with a highest range of RSSI values of the at least three ranges of RSSI values overlaps with a position of the second NFC device in the second device in the 2-dimensional heatmap.

11. The system according to claim 10, wherein the first NFC device is configured to indicate the information representative of the coupling by at least one of a visual indication or an audible indication.

12. The system according to claim 10, wherein the first NFC device is configured to measure the RSSI values from the second NFC device, according to a relative position of the first NFC device antenna with respect to the second NFC device antenna.

13. The system according to claim 12, wherein the first NFC device is configured to compare the measured RSSI values with a target value.

14. The system according to claim 13, wherein the target value is stored in at least one of an internal memory of the first NFC device or a remote server.

15. A system, comprising:

a first near-field communications (NFC) device, of a first device, configured in reader mode, the first NFC device having a user interface; and a second NFC device configured in card mode, the first device being configured to:

evaluate an information representative of a coupling between the first NFC device and the second NFC device, as a function of a position of an antenna of the first NFC device with respect to an antenna of the second NFC device, the evaluating the information including measuring a plurality of RSSI values provided by the second NFC device for different positions of the antenna of the first NFC device with respect to the antenna of the second NFC device, and for each RSSI measurement, measuring a movement of the first NFC device with respect to the second NFC device;

indicate the information by the user interface of the first NFC device, wherein indicating the information includes mapping the information representative of the coupling based on a distribution of received signal strength indication (RSSI) values in at least three ranges of RSSI values and displaying a 2-dimensional heatmap in which each color is associated with a respective range of RSSI values of the at least three ranges of RSSI values, wherein the heatmap comprises a first heatmap charting the distribution of the RSSI values in the at least three ranges of RSSI values corresponding to a movement of the first NFC device in relation to the second NFC device in a first direction, and a second heatmap charting the distribution of the RSSI values in the at least three ranges of RSSI values corresponding to a movement of the first NFC device in relation to the second NFC device in a second direction perpendicular to the first direction; and display the 2-dimensional heatmap superposed on an image of a second device including the second NFC device, wherein a position of a color associated with a highest range of RSSI values of the at least three ranges of RSSI values overlaps with a position of the second NFC device in the second device in the 2-dimensional heatmap.

\* \* \* \* \*